May 19, 1959  M. DUFFY ET AL  2,887,021
APPARATUS FOR FEEDING BLANKS TO A CONTAINER FABRICATING MACHINE
Filed April 4, 1956  7 Sheets-Sheet 1

INVENTORS:
Michael Duffy and
Vincent Peter Soules
By Carlson, Pitzner, Hubbard & Wolfe
Att'ys.

May 19, 1959　　　　M. DUFFY ET AL　　　　2,887,021
APPARATUS FOR FEEDING BLANKS TO A CONTAINER FABRICATING MACHINE
Filed April 4, 1956　　　　　　　　　　　　　　7 Sheets-Sheet 3

INVENTORS:
Michael Duffy and
Vincent Peter Soules
By Carlson, Pitzner, Hubbard & Wolfe
Attys.

May 19, 1959 M. DUFFY ET AL 2,887,021
APPARATUS FOR FEEDING BLANKS TO A CONTAINER FABRICATING MACHINE
Filed April 4, 1956 7 Sheets-Sheet 4

INVENTORS:
Michael Duffy and
Vincent Peter Soules
By:- Carlson, Pitzner, Hubbard & Wolfe
Attys.

May 19, 1959 M. DUFFY ET AL 2,887,021
APPARATUS FOR FEEDING BLANKS TO A CONTAINER FABRICATING MACHINE
Filed April 4, 1956 7 Sheets-Sheet 6

INVENTORS:
Michael Duffy and
Vincent Peter Soules
By: Carlson, Pelzner, Hubbard & Wolfe
Att'ys.

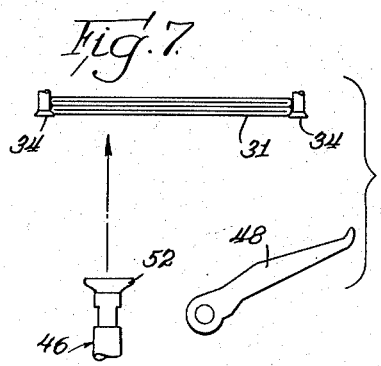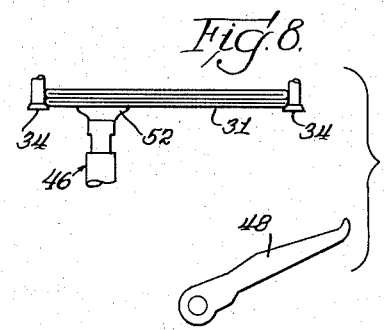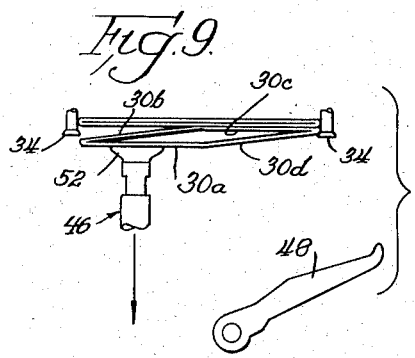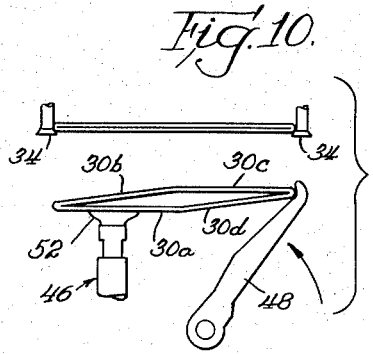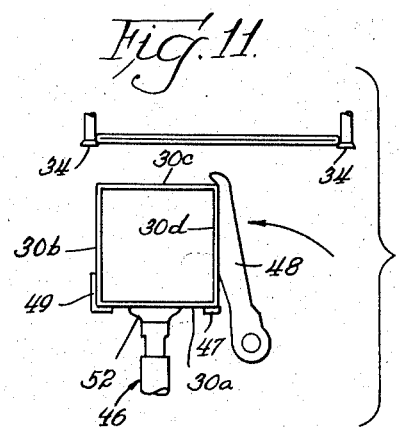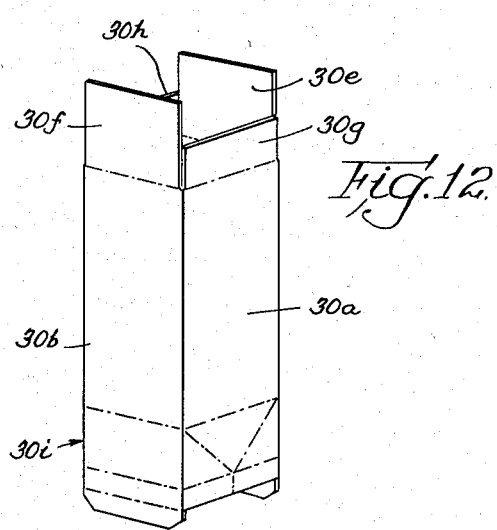

United States Patent Office 2,887,021
Patented May 19, 1959

2,887,021

APPARATUS FOR FEEDING BLANKS TO A CONTAINER FABRICATING MACHINE

Michael Duffy, Ferndale, and Vincent P. Soules, Detroit, Mich., assignors to Ex-Cell-O Corporation, Detroit, Mich., a corporation of Michigan Application April 4, 1956, Serial No. 576,084

1 Claim. (Cl. 93—53)

The present invention relates in general to machines for fabricating paper containers, and, more particularly, to an improved mechanism for feeding and erecting blanks of paper board or the like in such a machine. Another aspect of the invention concerns a novel method of accomplishing the feeding and erection of flat-folded tubular container blanks.

Container fabricating machines of the type to which this invention relates are usually capable of automatically performing all of the necessary operations in forming from a flat-folded blank a filled and sealed container ready for storage or shipment. In such a machine, a procession of flat-folded tubular blanks is normally withdrawn from an appropriate magazine and passed through a feeding and erecting mechanism, a bottom forming mechanism, a moisture proof coating mechanism, a cooling apparatus, and filling, closing and sealing mechanisms.

One of the objects of the invention is to provide an improved, high speed, feeding and erecting mechanism which has a minimum of component parts and effects opening of flat-folded tubular blanks with a minimum of physical distortion of the blanks. An ancillary object is to provide a mechanism of this character and which reduces the amount of manipulation required to open the container blanks.

Another object is to provide a blank feeding and erecting mechanism which eliminates the necessity for a conventional rotating turret type of blank gripping member and its associated component parts.

A further object is to provide a blank feeding and erecting mechanism of the type set forth and which is of simple construction requiring a minimum of care and maintenance.

Other objects and advantages of the invention will be apparent upon reading the attached detailed description in connection with the accompanying drawings, in which.

Figs. 7-11 inclusive, are diagrammatic views illustrating the various steps in the process of squaring out a container blank.

Fig. 12 is a perspective view of an illustrative container blank which has been squared out in accordance with the present invention.

While the invention is illustrated and described in some detail with reference to a particular embodiment and mode thereof, there is no intention that it be limited to such detail. On the contrary it is intended to cover all modifications, alternative constructions and equivalents falling within the spirit and scope of the invention as defined by the appended claims.

Figure 1:
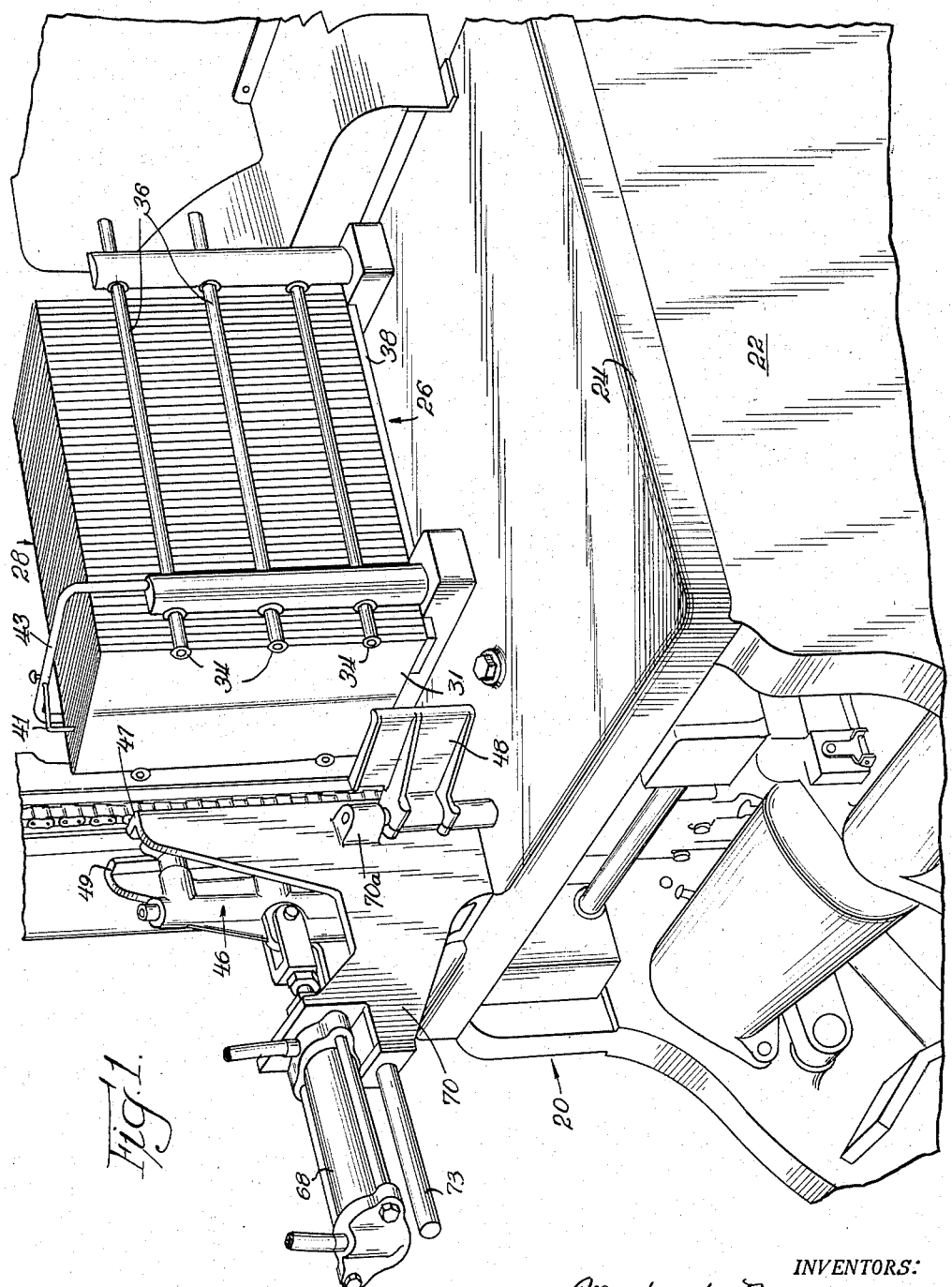
Figure 1 is a fragmentary perspective view of an illustrative container fabricating machine, showing some of the features of the feeding and erecting mechanism which comprises the subject matter of the present invention.

Turning now to Fig. 1, there is shown for illustrative purposes an exemplary container fabricating machine 20 having a base 22 upon which is supported a table-like top member 24. The base 22 comprises a frame within which the drive elements of the machine are housed along with the container bottom forming mechanism and certain of the other operative components.

Mounted on the machine top 24 is a magazine 26 for supporting in pack formation a plurality of collapsed tubular blanks 28. Each such blank is of flat-folded tubular form, having a front face comprising a pair of adjacent side panels and a rear face comprising another pair of adjacent side panels. As shown, the magazine 26 has a width of approximately two of such adjacent side panels and is adapted to hold a considerable number of individual collapsed blanks 30, each vertically disposed and closely engaged by the blanks ahead and behind. The pack extends horizontally from a pack advancing member 32 to a plurality of pack retainers 34, these retainers preferably comprising disc-like parts rigidly secured upon the ends of several horizontally extending and vertically spaced pack containing rails 36. The inner edges of the pack retainers 34 project inwardly so that each blank, such as the end blank indicated at 31, as it reaches the end of the pack, is engaged along its vertical edges by the retainers. The container blanks are thus held in position until removed.

The pack advancing member 32 is longitudinally slidable along the magazine on a base member 38. For constantly urging this member toward the pack of blanks 28, a weight (not shown) is hung from cables 40 which pass around a plurality of pulleys 42 and are fixed to the member 32. In this way the pack is constantly fed in such a manner that the end container blank 31 will be maintained in pressing engagement with the pack retainers 34. A finger 41 mounted on the magazine 26 by means of a small bracket 43 prevents interlocking of the blank flaps during operation.

Each of the container blanks 30 comprises a single blank sheet of paper cut and scored longitudinally so as to be divided into a series of four side-by-side panels, 30a, 30b, 30c, and 30d, the opposite side panels of the series being folded in relatively to each other along the scorings and adhesively secured together along their adjacent edges. In this way an elongated tubular container (Fig. 12) of rectangular cross-section results which, when suitably coated, may be used for the storage and transportation of liquids. The blanks shown also include two major bottom flaps 30e, 30f, two minor bottom flaps 30g, 30h, and various rectangular and triangular panels which together comprise the foldable top portion generally indicated at 30i. The scorings formed in the blank and dividing the various panels from each other are indicated in dotted lines. In the usual case the blanks from which the containers are made are cut and scored at the plant or factory of a paper fabricator, being flattened or collapsed so that they may be packed and transported with others in large numbers and in pack formation. The flattened blanks are then squared out or opened and formed into tubes at the points of consumption, as for example in dairies.

Figure 2:
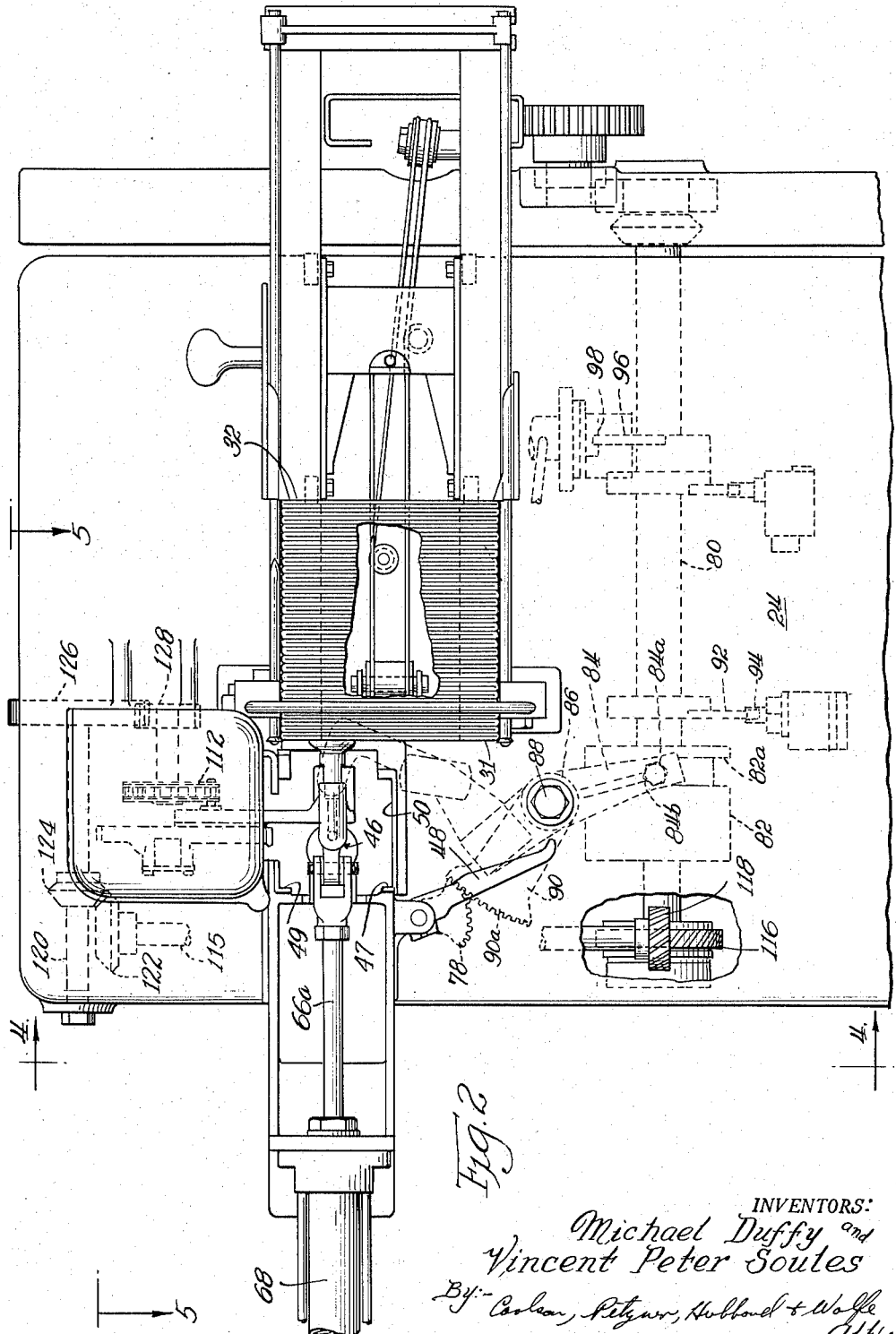
Fig. 2 is a fragmentary plan view of the feeding and erecting mechanism shown in Fig. 1.
Figure 3:
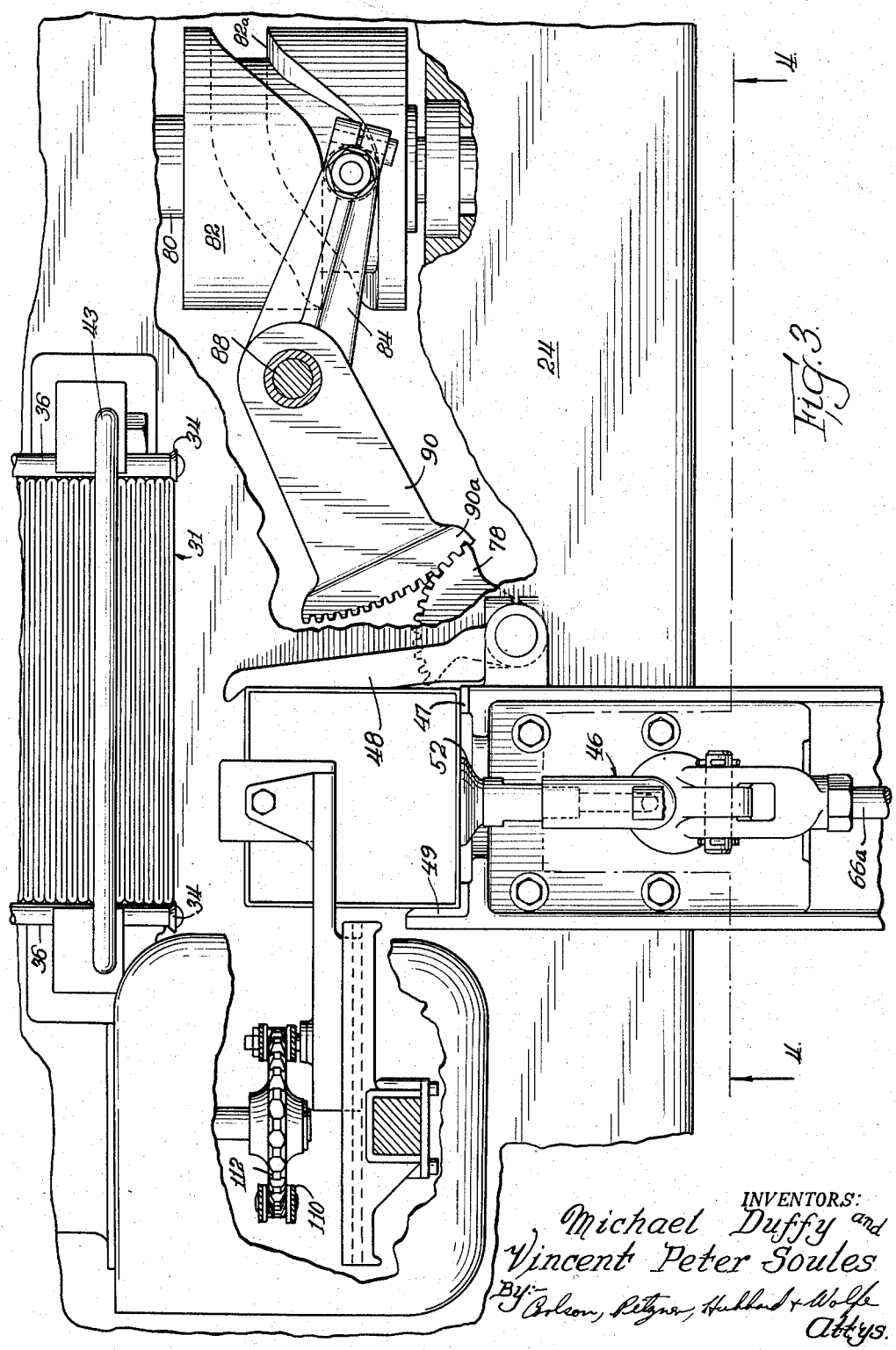
Fig. 3 is an enlarged fragmentary plan view, partly cut away and partly in section, showing the details of construction of the feeding and erecting mechanism.

In carrying out the invention, a high-speed container feeding and erecting mechanism 44 (Figs. 1, 2 and 3) is provided for successively withdrawing flat-folded tubular blanks from the magazine 26 with linear movement, squaring out such blanks into tubes of rectangular cross section during such linear movement and as an incident to such withdrawal, and discharging such squared out blanks into a receiving chute for further processing in the machine. This is accomplished in the present instance by means of a pick-up head 46 disposed for reciprocation between an advanced position adjacent said magazine and a retracted position remote from said magazine along an axis which intersects one of the side panels of the front face of the end blank 31 in the magazine. The pick-up head 46 is, in its advanced position, adapted to engage the end blank 31 on one of its side panels. Mounted in spaced relation with the magazine 26 are a pair of upstanding abutments 47, 49 so situated that when the pick-up head 46 is in its retracted position, the engaged side panel of the blank 31 is in contact with said abutments. The receiving chute 50 is located between the magazine 26 and the abutments 47, 49, both abutments being in alinement with one side of the chute and the abutment 49 defining an extension of one corner of the chute. A gate member 48 is pivotally mounted for arcuate movement relative to the abutments 47, 49 and to the axis of reciprocation of the pick-up head 46. The gate member 48 is driven in timed relation with the pick-up head 46 and is adapted to apply pressure to the edge of the blank diagonally opposite the corner abutment 49 so as to square out the blank as an incident to the stroke of the pick-up head from its extended to its retracted position. The opened container is thus precisely alined with the upper end of the receiving chute 50 and is thereupon pushed longitudinally of itself into the chute for engagement with a suitable bottom forming mechanism (not shown) and subsequent processing in the machine. The members of the mechanism 44 are then in position to repeat the cycle.

Referring particularly now to the pick-up head 46, it will be seen that this device comprises one or more suction elements 52 adaptable to engage the blank 31 which occupies the end position in the pack. Each suction element 52 is mounted upon the end of a horizontally disposed arm 54, of which there are three, the opposite ends of these arms being attached to and preferably formed integrally with a vertical riser 56. The suction cups 52 may be of any conventional type and the arms 54 and the riser 56 are apertured or bored out to provide channels in which a sub-atmospheric pressure, and atmospheric or greater than atmospheric pressure, may alternately exist. The channel in the vertical riser 56 is in communication with a vacuum pump (not shown) through a channel formed in the fitting 58, the flexible conduit 60, fitting 62 and a conduit 64 which leads to the vacuum pump or the like. A suitable valve means (not shown) interposed between the riser 56 and the vacuum pump insures the establishment of a sub-atmospheric pressure in each suction device 52, and the re-establishment of atmospheric or greater than atmospheric pressure in each such device at precisely timed periods in the cycle of operation of the mechanism.

Means for advancing and retracting the pick-up head 46 is shown in the form of a piston and cylinder assembly 66, 68, respectively, rigidly secured to a bracket 70 which is in turn fixed to the top surface 24 of the machine 20. As will be seen, a piston stem 66a extending from the cylinder 68 is secured at its outer end to the vertical riser 56 by means of a yoke type connection 72. In addition to this connection, the pick-up head 46 has fixed thereto a guide bar 73 which slidably engages a sleeve in the bracket 70. Accordingly, alternate introduction of air under pressure from any suitable source (not shown) through conduits 74 to the respective ends of the cylinder 68 will force the piston 66 to reciprocate within the cylinder to thereby advance or retract the suction gripping cups 52 toward or away from the magazine 26. For actuating the pick-up head 46, then, a piston and cylinder assembly 66, 68 is employed which is simple, requires a minimum of maintenance and care, and may be easily controlled using a simple on-off type valve. Moreover, the illustrative pick-up head undergoes strictly linear reciprocating motion, there being no complex rotary mechanisms employed or required.

Turning now to the container erecting member 48, it will be seen that this member takes the form in this instance of a flat, rectangularly shaped gate. Pivotal mounting for the gate 48 is provided by a pivot post 76 journaled at its upper end in an extension 70a carried by the bracket 70. The lower end of the pivot post 76 extends downwardly through the machine top 24 and is journaled therein. The gate 48 has one edge portion securely fastened to the pivot post 76 for rotation therewith.

Rotary or swinging motion is imparted to the gate member 48 through a toothed quadrant 78 rigidly secured beneath the machine top 24 to the lower end of the pivot post 76 and adapted to be driven from a main drive shaft 80. Thus, upon particularly referring to Figs. 2 and 3 it will be seen that power take-off from the main drive shaft 80 to the container erecting member 48 is effected through a barrel cam 82 fixed to a mid-portion of the shaft. One end of a cam follower arm 84 rides in a cam track 82a in the cam 82, and the other end of this arm terminates at the lower end of a central hub 86 rotatably mounted beneath the machine top plate 24 by means of a pivot 88. Integrally formed with the upper end of the central hub 86 is another arm 90 extending generally oppositely to the cam follower arm 84 and carrying at its outer end a toothed segment portion 90a, which latter is enmeshed with the toothed quadrant 78. Hence, as the main drive shaft 80 revolves and the follower arm 84 rides along the cam track 82a, the segmented gear members 78 and 90a translate the horizontal swinging motion of the cam follower into swinging motion of the gate member 48 between open and closed positions thereof.

Attention is drawn to the particular timed relationship provided between the operation of the suction gripping devices of the pick-up head 46 and the operation of the pivoted container erecting member 48. Simultaneous cooperating movement of these parts is effected to assure rapid and positive opening and squaring out of the container blanks 30 as an incident to each retracting stroke of the pick-up head 46. Thus, upon reference to Figs. 2 and 4, it is seen that reciprocal motion of the pick-up head 46 toward and away from the magazine 26 is controlled by a plate cam 92 fixed to the main drive shaft 80 and a roller follower 94. The follower 94 is suitably connected to an air pressure valve (not shown) to direct air under pressure to one end or the other of the piston and cylinder assembly 66, 68. The desired timing is attained by simply adjusting a cam follower member 84a along a longitudinal slot 84b provided in the arm 84.

Control of the alternate application and release of vacuum to the suction cups 52 is effected by yet another cam and follower arrangement 96, 98, respectively. Again the plate cam 96 is fixed to the main drive shaft 80 and the roller follower 98 is connected with the above mentioned vacuum valve means (not shown) to alternately apply and dissipate a vacuum. Of course vacuum is applied to the suction gripping elements 52 of the pick-up head 46 as this device begins forward movement toward the magazine 26. Vacuum is maintained during engagement of the end blank 31 by the suction cups 52 and throughout the retractive motion of the pick-up head 46. Dissipation of the vacuum under control of the cam and follower arrangement 96, 98 is effected only when the pick-up head 46 reaches the limit of its retractive travel and the squared out contained is ready to be pushed down the chute 50. After momentary dissipation, the vacuum is again applied for the next operating cycle.

In its movement from the magazine 26 to the chute 50, the end blank 31 occupies a number of successive positions. Certain of these positions are indicated somewhat diagrammatically in Figs. 7–11, inclusive. The blanks of the pack are shown to be inverted, i.e. foldable top portions lowermost and bottom flaps uppermost, since the squared-out blanks are to be inserted in the chute while so positioned.

As shown in Figs. 7 and 8, the pick-up head 46 begins the cycle by moving toward and engaging the adjacent side panel of the end blank 31 of the magazine 26. During this motion, the air pressure control cam and follower arrangement 92, 94 are set to admit air under pressure to the piston and cylinder 66, 68 so as to move the pick-up head 46 forwardly toward its extended position. Vacuum under control of the cam and follower arrangement 96, 98 is applied to the suction cups 52 as discussed above. During this time, the gate member 48 remains stationary since there is no horizontal movement of the barrel cam follower arm 84 in the cam track 82a.

Fig. 9 shows the end blank 31 bowed slightly outwardly by retractive or rearward movement of the pick-up head 46. The air pressure control cam and follower 92, 94 have now thrown the air valve so that air under pressure is admitted to the opposite end of the cylinder 68, with the other end being exhausted to the atmosphere. The blank 31 is thus drawn past the retainers 34 so that it is entirely free of the magazine 26. The gate member 48 is still stationary.

Cooperation of the gate member 48 with the pick-up head 46 to effect squaring out of the blank 31 is illustrated in Fig. 10. Thus, continued retractive movement of the pick-up head 46 from the position shown in Fig. 9 is accompanied by the inward or closing swinging motion of the gate 48. Such motion of the gate member 48 is under the influence of the barrel cam and follower 82, 84, the timed relation between this cam and follower arrangement and the air pressure control cam and follower arrangement 92, 94 being such that the pivoted gate engages the adjacent side edge of the blank 31 as the latter is moved longitudinally rearwardly. Subsequently, the swinging action of the gate 48 squeezes the side seamed blank from a relatively flat configuration into a square tubular shape.

Fig. 11 shows the rearmost position of the pick-up head 46 with the now squared container still held thereon by the suction cups 52 and with its gripped side panel in contact with the abutment members 47, 49. In this position the gate member 48 is in its extreme closed position (flat against one side of the container) and serves to hold the container in squared shape against the corner abutment member 49, the latter being fixed on the machine top 24 in aligned relation with one corner of the chute 50. The squared out blank is thus in superimposed and precisely registered position over the chute 50 and is released by the dissipation of vacuum to the suction cups 52. The pick-up head 46 is then in readiness to engage the next succeeding end blank to repeat the cycle of operations.

For moving the square container downwardly in the chute 50 to the bottom forming mechanism, a pusher mechanism 102 is provided. The pusher mechanism 102 comprises a pusher head 104 movable axially of the chute 50, and a container blank engaging plate 106 supported upon the pusher head. The head 104 is supported upon an arm 108 which is attached to one vertical reach of a pusher chain 110 which passes around upper and lower sprockets 112, 114, respectively, arranged in vertically superimposed relationship. In the operation of the mechanism 102 the pusher head 104 is operated in timed relationship to the pick-up head 46 after a squared-out container has been placed in the chute 50, pushing the container before it, and thereafter returning to its original position to advance a succeeding squared-out container.

As will be seen, slip motion of the arm 108 within a bracket 111 is afforded as the chain 110 passes around the top and bottom sprockets 112, 114. Thus the arm 108 is slidable within the bracket 111 and laterally of the chain 110 at the upper and lower sprockets. The bracket 111 is in turn slidable up and down along a vertical bar 113 secured lengthwise to the pusher mechanism 102.

Figure 4:
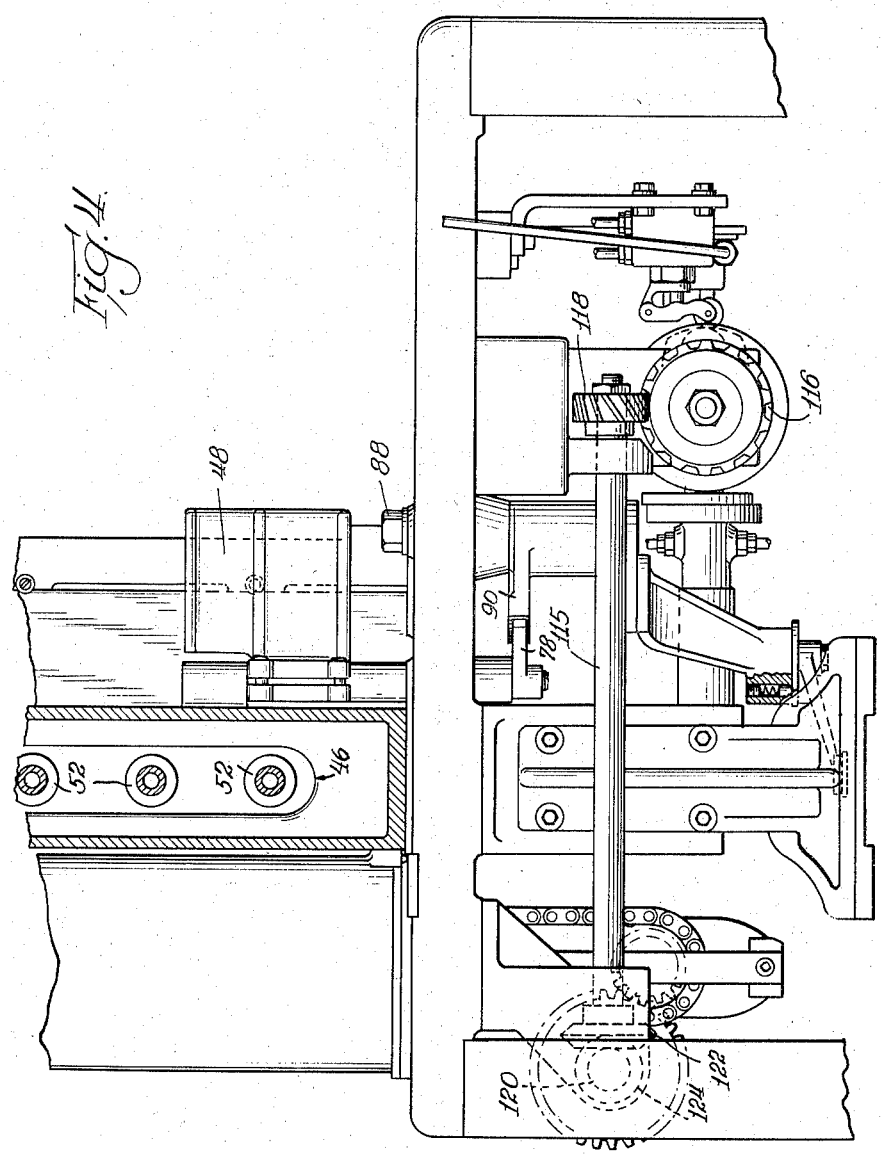
Fig. 4 is a fragmentary elevational view, partly in section, taken substantially along the line 4—4 in Fig. 2, and showing further details of the illustrative container feeding and erecting mechanism.
Figure 5:
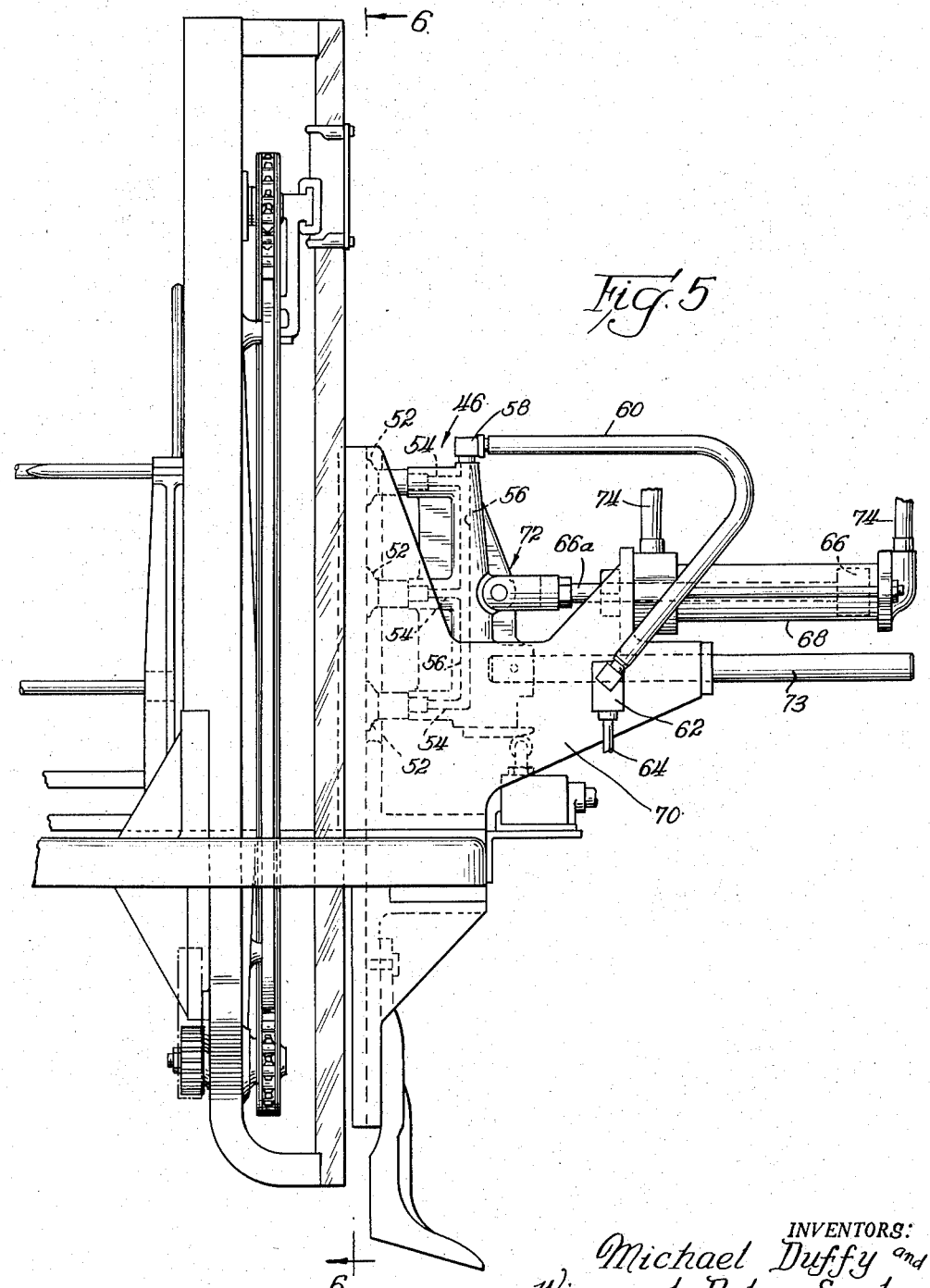
Fig. 5 is an elevational view taken substantially along the line 5—5 of Fig. 2, and showing details of the container pusher operating mechanism.
Figure 6:
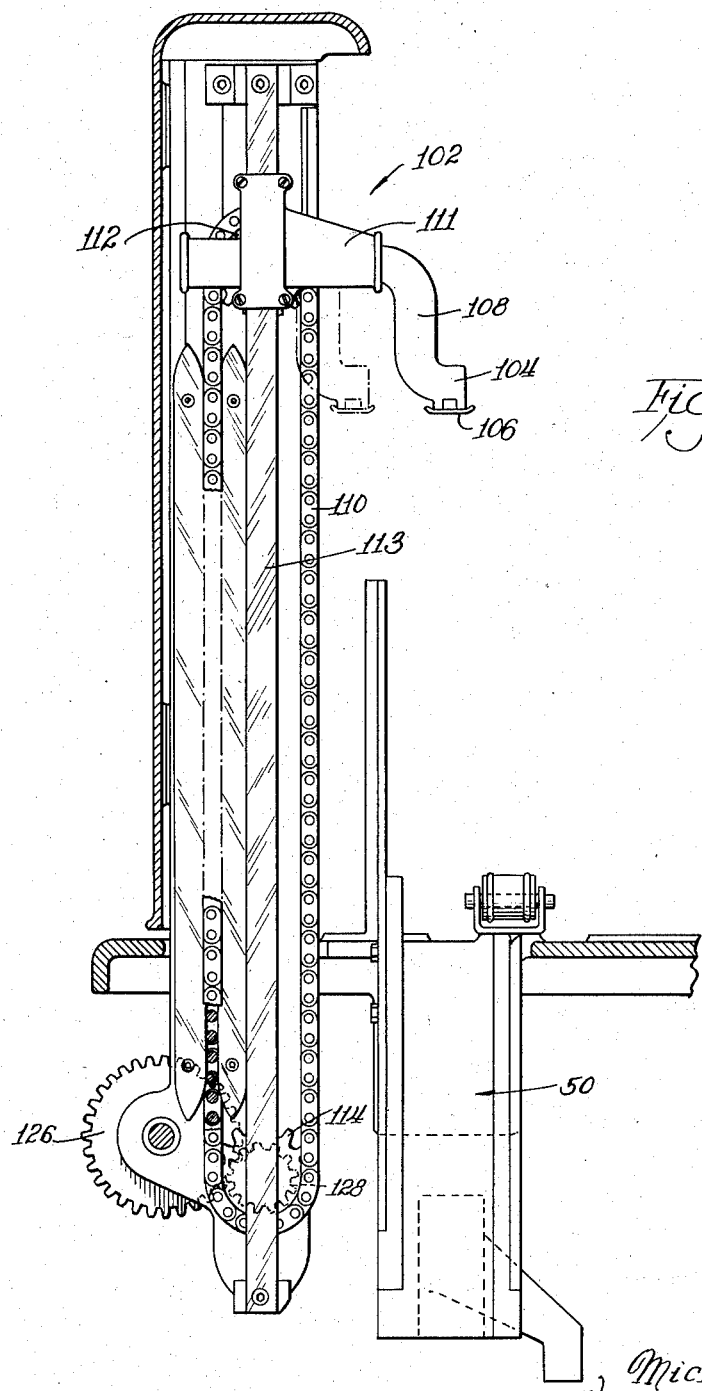
Fig. 6 is an elevational view, partly in section, taken along the line 6—6 in Fig. 5.

Power for actuating the pusher mechanism 102 in timed relationship with respect to the motion of the pick-up head 46 and the gate member 48 is derived from the main drive shaft 80. Thus as shown in Figs. 4 and 6, rotative power is transmitted to a horizontal cross shaft 115 from the main drive shaft 80 through a pair of enmeshed helical gears 116, 118. Thus the cross shaft 115 being operatively connected to the main power shaft 80 revolves at uniform velocity in one direction at all times. A third shaft 120, parallel with the main shaft 80 receives power from the cross shaft 115 through a pair of bevel gears 122, 124. Drive for the lower chain sprocket is transmitted from this third shaft 120 by means of large and small enmeshing spur gears 126, 128, respectively. In this way the pusher chain 110 moves at a constant rate which is predetermined by the various gear ratios to give the proper timed relation with the other operating components of the container feeding and erecting mechanism.

We claim:

In a container fabricating machine having a magazine for holding a supply of flat-folded tubular blanks each formed with a front face comprising a pair of adjacent side panels and a rear face comprising another pair of adjacent side panels, said magazine having a width of approximately two of said adjacent side panels, a feeding and erecting mechanism comprising, in combination, a pair of upstanding abutments disposed in spaced relation with one end of said magazine and mounted in alinement with one of the side panels of the end blank in said magazine, a receiving chute situated between said magazine and said abutments with the latter in alinement with one side of said chute and one of said abutments defining an extension of a corner of said chute, a pick-up head having a linear stroke extending from said magazine to said upstanding abutments, a pressure fluid actuator for reciprocating said pick-up head along said stroke, means on said pick-up head for engaging said one side panel of the end blank in said magazine and for carrying said blank through said linear stroke so as to bring said one side panel into engagement with said upstanding abutments, a gate member disposed for pivotal movement transversely of the stroke of said pick-up head and driven in timed relation with the latter, said gate member being adapted to apply diagonal pressure to said flat-folded blank as an incident to movement of said pick-up head along said stroke and to push the blank against said one abutment to square out the blank, means for releasing said squared blank from engagement with said pick-up head, and means for sliding said squared blank longitudinally of itself into said receiving chute along an axis disposed in transverse and intersecting relation to said stroke.

References Cited in the file of this patent

UNITED STATES PATENTS

| | | |
|---|---|---|
| 1,989,286 | Milmoe | Jan. 29, 1935 |
| 2,521,996 | Ray | Sept. 12, 1950 |